United States Patent [19]

Kermode

[11] 3,962,639
[45] June 8, 1976

[54] SYSTEM FOR REDUCING RADIO COMMUNICATION FREQUENCY BANDWIDTH AND INCREASING NUMBER OF CHANNELS AVAILABLE

[75] Inventor: David W. Kermode, Ridgecrest, Calif.

[73] Assignee: The United States of America as represented by the Secretary of the Navy, Washington, D.C.

[22] Filed: June 11, 1973

[21] Appl. No.: 368,567

[52] U.S. Cl. .................................. 325/59; 325/427
[51] Int. Cl.² .......................................... H04B 7/00
[58] Field of Search .................. 178/66, 68, DIG. 3, 178/67, 69 R; 179/15.55 R; 333/14; 328/147, 135, 150; 325/59, 427, 59–61

[56] References Cited
UNITED STATES PATENTS

| 3,339,142 | 8/1967 | Varsos ................................ 178/68 |
| 3,378,770 | 4/1968 | Daguet ................................ 325/60 |
| 3,538,246 | 5/1968 | Macovski et al. ............... 178/DIG. 3 |

OTHER PUBLICATIONS

"Communication Systems, An Introduction to Signals and Noise in Electrical Communications", Carlson, McGraw–Hill, c 1968, pp. 239–242.

Primary Examiner—Robert L. Griffin
Assistant Examiner—Aristotelis M. Psitos
Attorney, Agent, or Firm—R. S. Sciascia; Roy Miller; Robert W. Adams

[57] ABSTRACT

A modulated communication system having radio frequency bandwidth reduction in which level sensing circuits at the transmitter control the modulations such that information signals up to a predetermined and selected percent of the modulation level commonly used are transmitted as before, and information signals above that percentage are reduced so that they also begin at the zero amplitude level. That is, once the preselected threshold percentage is reached the signal level is reduced by that threshold amount so that, although all the information in the signal is retained, the signal level is prevented from being greater than the predetermined and selected threshold percentage. At the receiver, the rapid transistions of the transmitted signal between maximum and zero are responded to by a circuit which switches between its low level and high level to reverse the reduction of the high level signals at the transmitter. The present invention is applicable to both amplitude and frequency modulation systems.

8 Claims, 3 Drawing Figures

SYSTEM FOR REDUCING RADIO COMMUNICATION FREQUENCY BANDWIDTH AND INCREASING NUMBER OF CHANNELS AVAILABLE

BACKGROUND OF THE INVENTION

In the field of frequency bandwidth reduction systems wherein the bandwidth used in radio communication is reduced so that an increased number of channels are available in the airways, there is no known prior frequency modulation system for reducing the frequency bandwidth to less than 15 kilohertz. And, all prior systems that achieve reduction to less than 10 kilohertz reduce the bandwidth by restricting the audio frequency range. This is accomplished by arbitrarily cutting off audio frequencies above and below a narrow audio range. Such an audio frequency range might be, for example, from three kilohertz to 300 hertz. As a result, considerable distortion is encountered and, therefore, the type and amount of information which can be transmitted is restricted.

SUMMARY OF THE INVENTION

The present invention is a system and technique for reducing radio communication frequency bandwidth and increasing the number of channels available for communication, which comprises splitting the audio frequency amplitude voltage into two components. The first component consists of all voltage levels less than a specified percentage of the maximum modulation level, and the second consists of all voltage levels over the specified percentage level. Those over the percentage level are reduced to operate within the percentage level by causing the excess to begin again from zero. The first component is not provided by the circuit during the period the voltage level exceeds the preselected percentage. The first and second components are then summed to provide an output that maintains the character and information of the original signal, but never exceeds the predetermined percentage of the maximum modulation level.

Also included in the invention is an addition to a receiver which re-establishes the original signal waveform for processing by existing equipment.

DESCRIPTION OF THE PREFERRED EMBODIMENT

Figure 1:
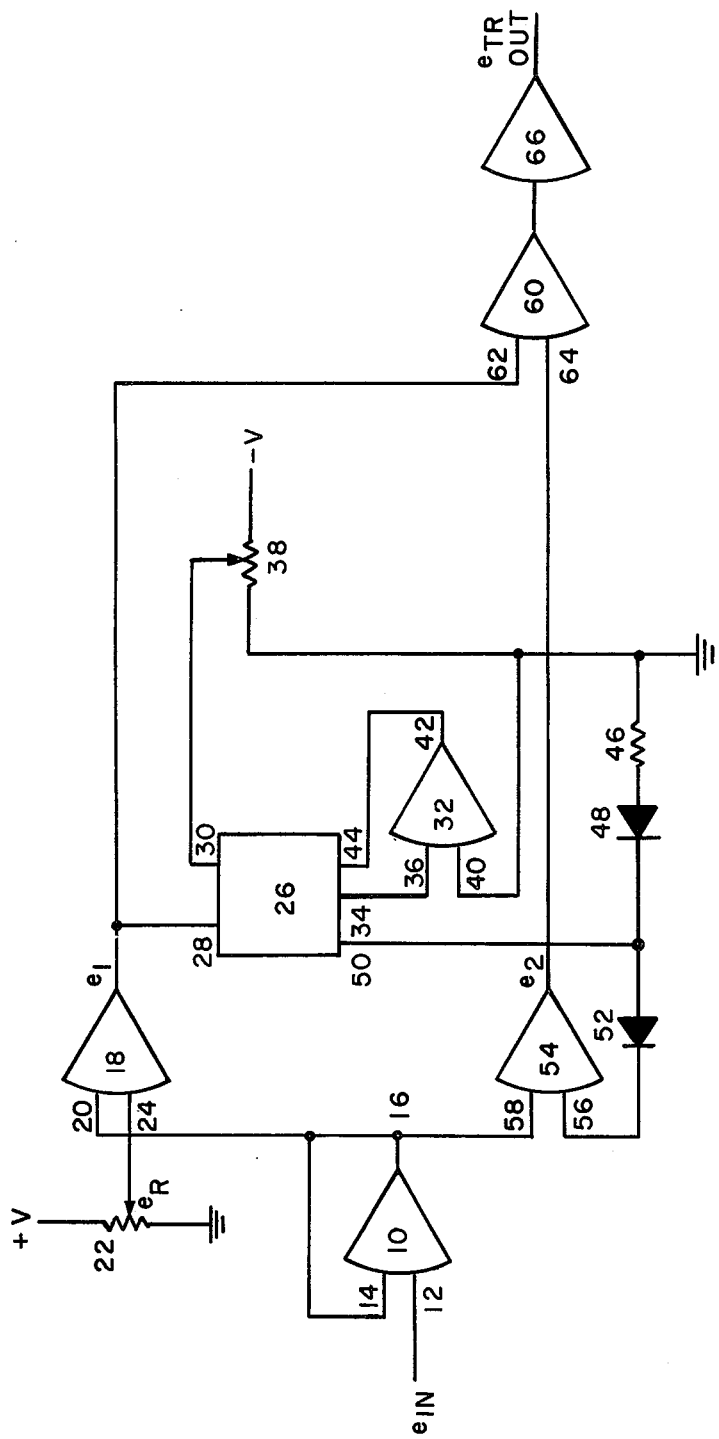
FIG. 1 is a schematic diagram of the transmitter addition of the preferred embodiment of the present invention.

FIG. 1 is a schematic diagram of the preferred embodiment of the addition to the transmitter. It splits the modulated input signal into two channels, provides an output from one channel when the input has an amplitude between zero and a selected threshold, and provides an output from the other channel when the input amplitude is greater than the threshold. As a result, the output of each channel remains below the threshold value. The channel outputs are summed and fed to the transmitter.

The input signal, $e_{in}$, such as from a microphone, is coupled to input 12 of operational amplifier 10. Operational amplifier 10 is a buffer having feedback to terminal 14 and providing unity gain and load isolation between the input and the circuitry. The output of operational amplifier 10 is split at junction 16 and coupled to terminal 20 of differential amplifier 18 and terminal 58 of differential amplifier 54.

A variable reference voltage, $e_R$, selected by setting variable resistor 22, is coupled to input 24 of differential amplifier 18. Amplifier 18 provides an output, $e_1$, that is equal to the quantity $Ke_{20}-e_{24}$, wherein K is the amplifier gain. The output is provided only when the input at terminal 20 exceeds the threshold reference voltage at terminal 24, i.e, when $e_{20}$ exceeds $e_{24}$.

The output, $e_1$, that is provided by differential amplifier 18 when the reference is exceeded, is coupled to input 62 of summing, wideband operational amplifier 60 and terminal 28 of adaptive high-speed comparator 26. Comparator 26 and its associated circuitry acts as a gate triggered by $e_1$ to disable differential amplifier 54. As a result, when the input exceeds the reference an output, $e_1$, is provided by differential amplifier 18, which output disables operational amplifier 54. If the input does not exceed the reference, $e_1$ is zero and differential amplifier 54 is not disabled. Therefore, only one of the differential amplifiers 18 and 54 will provide a non-zero output at any one time.

The circuitry associated with comparator 26 is shown as an example only of one way of providing the desired gating function. The circuitry shown is that which would be associated with the Adaptive High-Speed Comparator 9892/25 offered by Burr-Brown, which for this operation requires wideband operational amplifier 32 having input terminal 36 and output terminal 42 coupled to input 34 and 44 of comparator 26. Also, a terminal 30 of comparator 26 is coupled to a variable resistor 38 having one end coupled to a negative voltage source and the other coupled to input 40 of amplifier 32.

The output of comparator 26 is provided at terminal 50 and is coupled to the junction of diodes 48 and 52. If an output is provided at terminal 50, it is coupled through diode 52 to terminal 56, disabling differential amplifier 54 and causing the output, $e_2$, to be zero. Diode 48 and resistor 46 are coupled in series to ground to provide isolation and prevent transient signal interference with the operation of the circuit.

Outputs $e_1$ and $e_2$ are mutually exclusive in time, as discussed above, and are coupled to terminals 62 and 64, respectively, of wideband operational amplifier 60, which sums its inputs. Its output is coupled through buffer 66, for isolation, and is provided to the transmitter as output $e_{TR-OUT}$.

Figure 2:
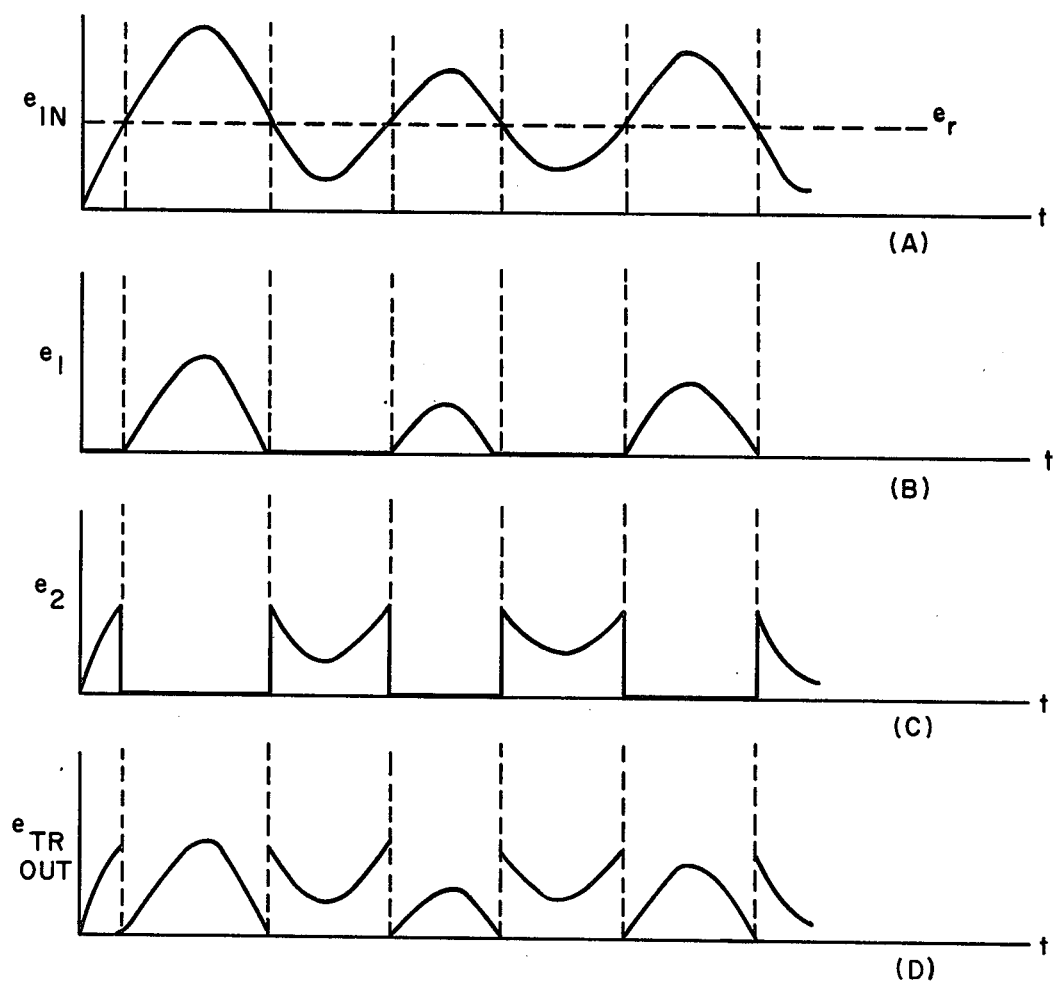
FIG. 2 shows an example of the waveform at various locations in the circuit of FIG. 1.

FIG. 2 shows the signal waveforms at various locations in the circuit of FIG. 1. The signals shown are descriptive only of the general waveform shape of the signal at the location referred to because the relative amplitudes are dependent on the components and specific design implemented. FIG. 2 (A) is descriptive of the input signal $e_{in}$, and the signal at junction 16 and terminals 20 and 58. The selectable reference voltage $e_R$ is also shown in FIG. 2 (A), and is shown as having a value equal to approximately 50 percent of the anticipated amplitude of the modulated signal. The percentage is, of course, selectable by varying resistor 22, but if the 50 percent value is chosen the waveform will be separated into two channels and both channels will be utilized approximately equally.

FIG. 2 (B) is indicative of the signal $e_1$ appearing at the output of differential amplifier 18. As can be seen, the output is zero until the threshold, or reference, is breeched, and then that portion of the signal having an amplitude greater than the reference, is faithfully reproduced. FIG. 2 (C) is indicative of the signal $e_2$ appearing at the output of differential amplifier 54. As is shown, the signal is faithfully reproduced until the threshold value is reached, at which time $e_2$ immediately reverts to zero. The circuit output, $e_{TR-OUT}$, shown in FIG. 2 (D) is the composite of $e_1$ and $e_2$. As is shown, each portion of the signal is faithfully reproduced while neither of the portions exceeds the threshold or reference $e_R$. As a result, the bandwidth necessary for transmitting the signal is reduced.

Figure 3:
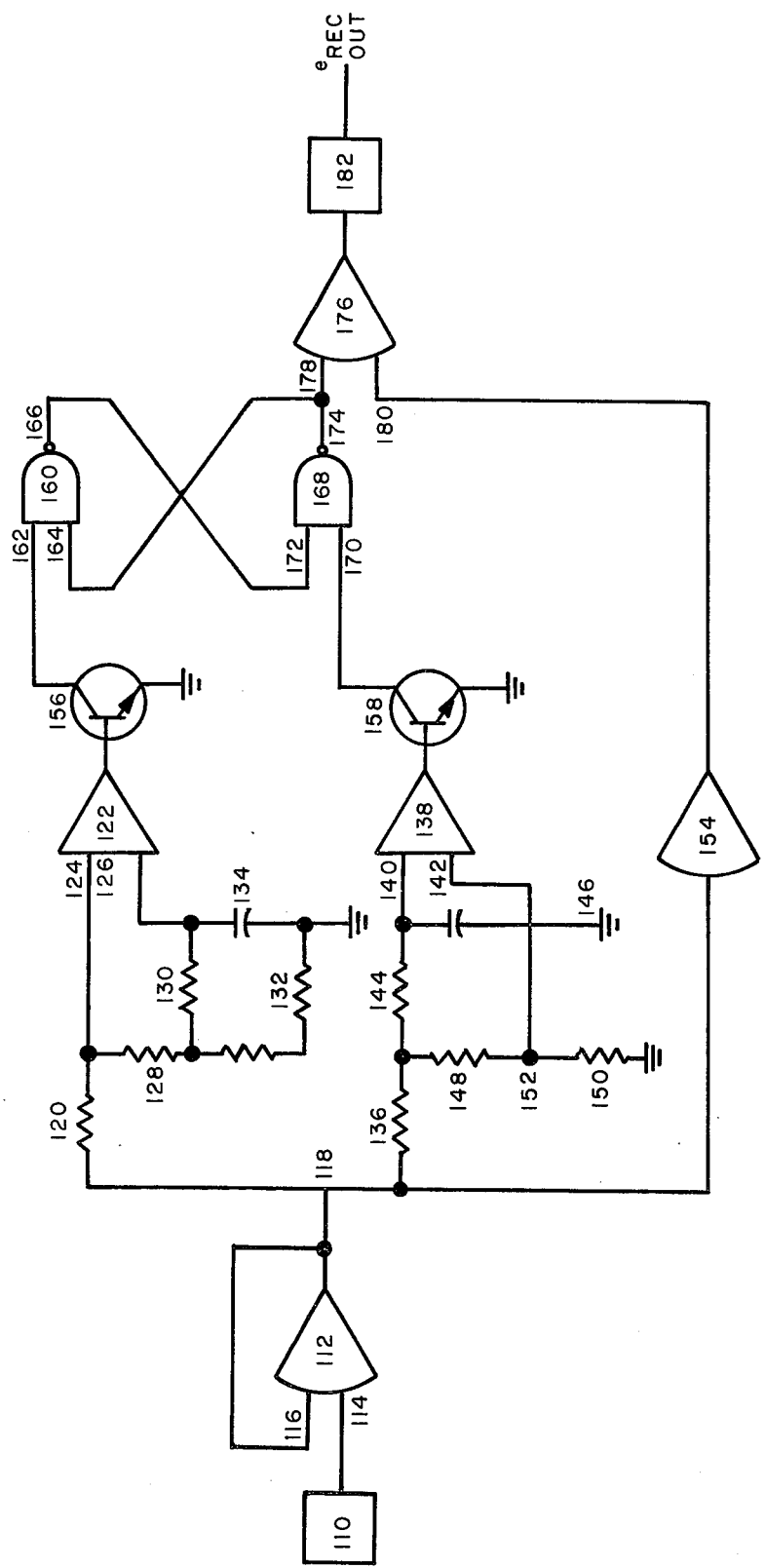
FIG. 3 is a schematic diagram of the receiver section of the preferred embodiment of the present invention.

The preferred embodiment of the addition to the receiver is shown in FIG. 3. The output of receiver 110 is coupled to terminal 114 of buffer 112. Buffer 112 has feedback to terminal 116 and provides unity gain and isolation between the receiver and the remainder of the circuitry. The output at junction 118 of buffer 112 is coupled to comparators 122 and 138, and their respective circuitry, and amplifier 154. Comparator 122 and its circuitry are designed to respond to a fast falling signal and cause a low level DC bias voltage to appear at terminal 178 of summing amplifier 176. Comparator 138, on the other hand, is designed to respond to a fast rising signal and cause a high level DC bias voltage to appear at terminal 178. The output of amplifier 154 is coupled to the other terminal, 180, of summing amplifier 176.

To backtrack, the signal appearing at junction 118 is coupled through resistor 120 to input 124 of comparator 122 and, additionally through resistors 128, 130, and 132, and capacitor 134, to terminal 126 of comparator 122. The tuned network is designed to respond to only fast falling signals, and provide a pulse to terminal 126 in response thereto. The output of comparator 122, if there be one, may be coupled through optional transistor 156 to control latching circuit 160/168.

The signal at junction 118 is also coupled through resistor 136 and the tuned circuit made up of resistor 144, 148, and 150, and capacitor 146, to terminals 140 and 142 of comparator 138. Terminal 142 is coupled to the junction 152 between resistor 148 and 150, the opposite end of resistor 150 being coupled to ground. The tuned circuit is responsive to fast rising signals and provides a pulse to terminal 142 in response thereto. The output of comparator 138, if there be one, may be coupled through optional transistor 158 to input 170 of latching switch 160/168.

Latching switch 160/168 is composed of NAND gate 160 having inputs 162 and 164 and output 166, wherein input 162 is coupled to optional transistor 156 associated with comparator 122; and, NAND gate 168 having inputs 170 abd 172, and output 174, wherein input 170 is coupled to optional transistor 158 associated with comparator 138. Output 174 of NAND 168 is coupled to input 164 of NAND gate 160, and output 166 of NAND gate 160 is coupled to input 172 of NAND gate 168. As mentioned above, an output from comparator 122 will set the latching switch 160/168 to provide a low level DC voltage output, and an output from comparator 138 will reset the switch to provide a high level DC voltage output to terminal 178 of summing amplifier 176.

The signal at junction 118 is, additionally, coupled to amplifier 154 which provides an output to terminal 180 of summing amplifier 176. The composite of the outputs of amplifier 154 and the latching switch 160/168 recreate the original signal, $e_{in}$, processed by the addition to the transmitter. The composite output of amplifier 176 is coupled through low pass filter 182 to, such as, a speaker or headset.

The following list of components is offered by way of example only to describe one operative embodiment of the present invention. The following types or values are component catalog numbers listed in the current Burr-Brown, Incorporated, catalog.

| Symbol | Components | Type or Value |
|---|---|---|
| 10, 18, 54 | Operational amplifier | 3226/03 |
| 26 | Adaptive High-Speed Comparator | 9892/25 |
| 32 | Wideband Operational Amplifier | 1510/25 |
| 60 | Wideband Operational Amplifier | 3064/12C |

The present invention reduces the radio frequency bandwidth required for transmission of a given information content. The bandwidth reduction, for example, may be 50 percent, with the radio frequency power radiation required reduced approximately the same percentage. Novel in this system is the division of the audio frequency modulation voltage level into two parts, a high level and a low level range; and, the reduction of the high audio voltage level modulation component to a level comparable to the low voltage range. Also new is the interlacing of the low level modulation voltages with reduced voltage level audio frequency components; and, the system for separating the high and low level audio frequency components at the transmitter, and for rectifying the received signal to normal voltage direction and levels.

What is claimed is:

1. A system for reducing the bandwidth required to transmit frequency modulated electrical signals, comprising:

a transmitter for transmitting electrical signals, including means for reducing only those amplitudes that are greater than a preselected threshold to a level lower than said threshold, having a plurality of circuit channels, wherein the first of said channels provides the output of the transmitter when the signal amplitude is less than said threshold, and the second of said channels provides the output of the transmitter when the signal amplitude is greater than said threshold level; and a receiver for receiving said transmitted electrical signals, including means for reconstructing the waveform that existed before said reduction;

such that the bandwidth required to transmit said signals is less than the bandwidth required to transmit the unreduced signals.

2. The system of claim 1 wherein said first channel includes an operational amplifier coupled to the unreduced signal of said transmitter, and said second channel includes an operational amplifier coupled to the unreduced signal of said transmitter and a preselected threshold voltage, wherein said second channel operational amplifier compares said unreduced signal to said threshold voltage and provides an output that is the difference between the two.

3. The system of claim 2 wherein said reducing means also includes comparing means coupled to said first channel and said second channel for disabling said second channel when the amplitude of said unreduced signal is greater than said threshold, such that the outputs of said channels are mutually exclusive in time.

4. The system of claim 3 wherein said reducing means coupled to said first and second channels for providing their combined outputs as the transmitter output.

5. The system of claim 1 wherein said reconstructing means includes a plurality of channels where the first channel provides an output in response to a pulse rising to said threshold at the input of said receiver, and the second channel provides an output in response to a pulse falling from said threshold at the input of said receiver wherein the first channel output level is greater than the second channel output level.

6. The system of claim 5 wherein said reconstructing means also includes a third channel coupled to the receiver input, and a summing means coupled to said first, second, and third channels for combining and summing the outputs of said three channels and providing the output of the reconstructing means.

7. The system of claim 6 wherein said first and second channels include resistive-capacitive tuned circuits.

8. A method for reducing the bandwidth required to transmit frequency modulated electrical signals, including the steps of:
  detecting the signal amplitudes that are greater than a preselected threshold level;
  reducing that portion of the signals that are greater than the threshold by the threshold level;
  combining the reduced and unreduced portions;
  electrically transmitting the combination;
  electrically receiving said combination;
  detecting any signal portion within said combination that increases in amplitude to a level greater than said threshold level, and any signal portion within said combination that decreases in amplitude to a level less than said threshold level
  generating a pulse in response to said decreasing signal portion and a higher level pulse in response to said increasing signal portion; and
  combining the pulse generated in response to said decreasing signal portion with said received unreduced portion and the pulse generated in response to said increasing signal edge with said received reduced portion;
  such that the last said combination reconstructs the original signal.

* * * * *